Figure 1:
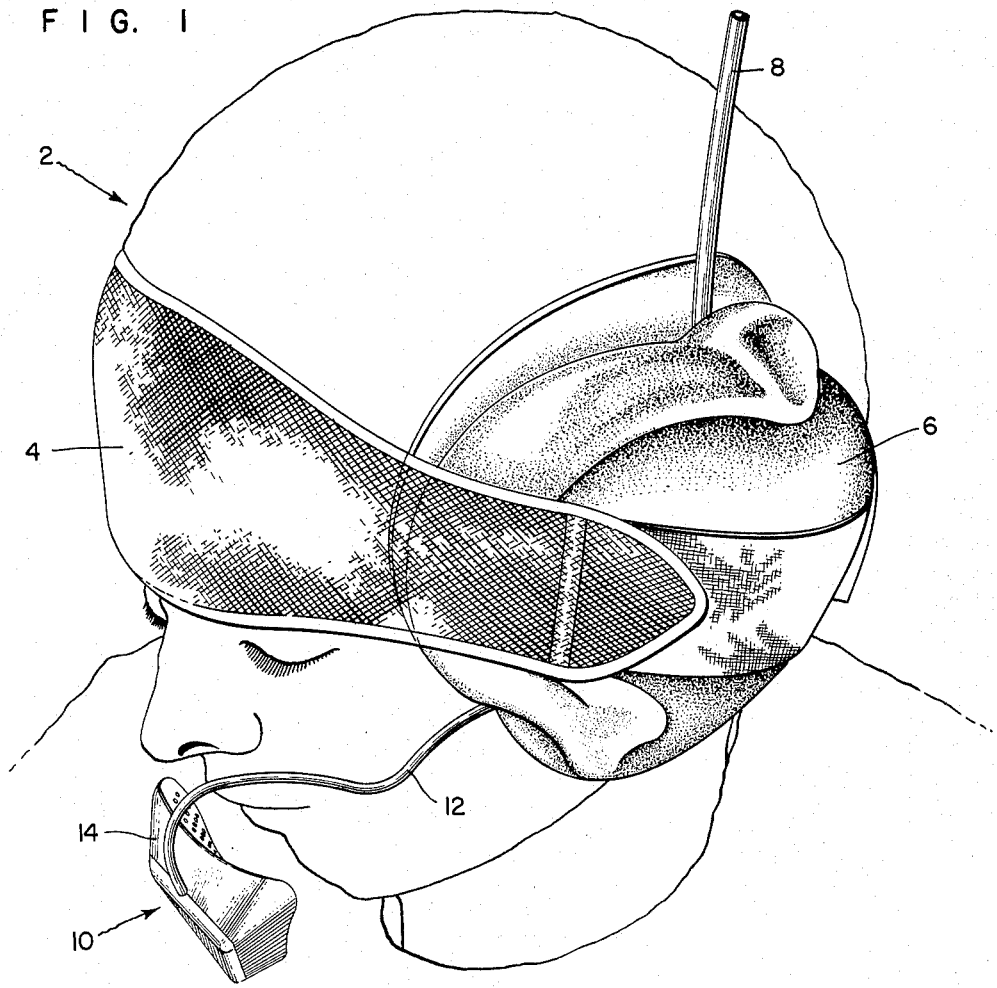

March 22, 1966     T. N. TYLER     3,241,549
RESPIRATION DETECTOR

Filed Sept. 25, 1962     2 Sheets-Sheet 1

INVENTOR.
TOMMY N. TYLER

BY *Arthur H. Swanson*

ATTORNEY.

March 22, 1966     T. N. TYLER     3,241,549
RESPIRATION DETECTOR
Filed Sept. 25, 1962     2 Sheets-Sheet 2
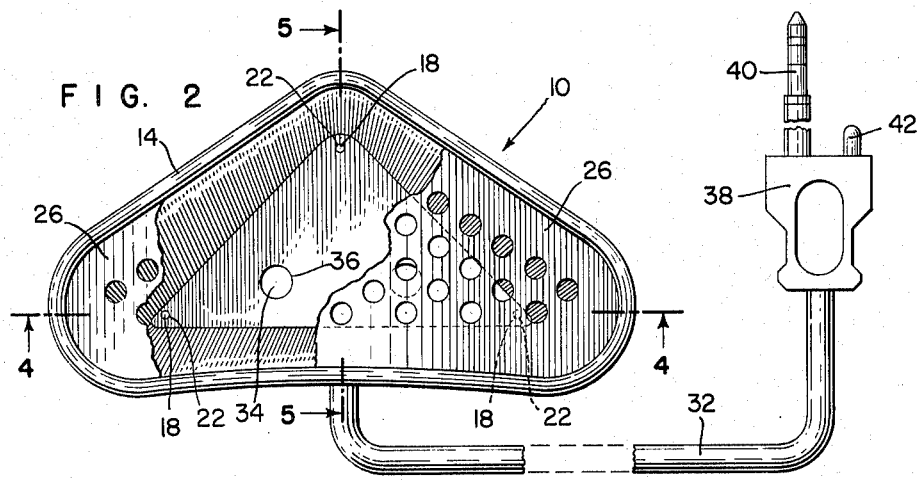
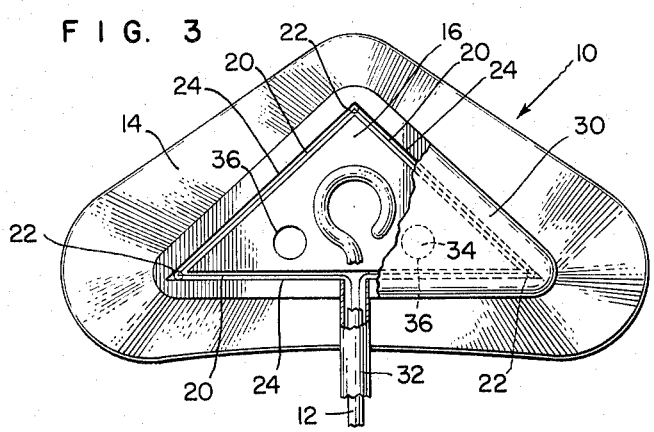
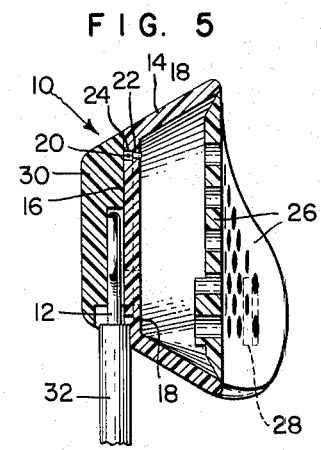
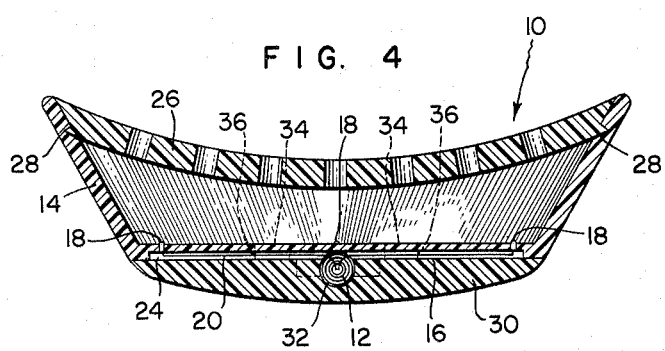
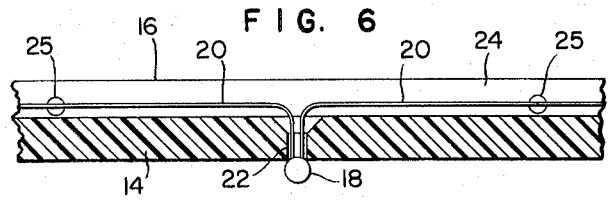
INVENTOR.
TOMMY N. TYLER
BY *Arthur H. Swanson*
ATTORNEY.

United States Patent Office 3,241,549
Patented Mar. 22, 1966

3,241,549
RESPIRATION DETECTOR
Tommy N. Tyler, Littleton, Colo., assignor to Honeywell, Inc., a corporation of Delaware
Filed Sept. 25, 1962, Ser. No. 226,053
1 Claim. (Cl. 128—2)

This invention relates to electrical apparatus, and more particularly the electrical medical instrumentation.

In the art of medical instrumentation it has been found desirable, under certain conditions, to maintain a substantially running record of certain body functions, such for example, as diastolic and systolic blood pressure, pulse rate, body temperature and respiration rate. A body function monitoring and recording system is disclosed in co-pending application Serial No. 122,885 filed July 10, 1961, in the name of Erickson, Girard and Drury. In that case, specifically there is disclosed not only the recording system but particularly means for detecting and producing signals representative of diastolic and systolic blood pressure as well as pulse rate. The present invention relates specifically to means for detecting the respiration of a person under observation and which may be used to produce an electric signal representative thereof.

It is, accordingly, an object of the present invention to provide an improved respiration detector for medical instrumentation purposes.

It is another object of the present invention to provide improved respiration detector as set forth characterized in its high sensitivity, its convenience of application, its response to the exhalation of breath, whether from the nose or mouth, and the absence of discomfort or inconvenience imposed upon the person under observation.

In accomplishing these and other objects, there has been provided, in accordance with the present invention, a respiration detector comprising a plurality of thermistors positioned on a plastic body member which is provided with a protective cover. The plastic base member is supported on one end of a rigid but relatively deformable or flexible support rod member the other end of which is mounted in a suitable terminal plug structure. Thus positioned, the detector is carried freely in space with respect to the face of the wearer and is responsive to the exhalations of breath whether from nose or mouth, or both. That is, the detector is not secured to the nose or mouth of the wearer by such means as masks and/or straps, as in some prior art devices. The electrical wires leading from the thermistors are carried adjacent the support rod structure within a protective, flexible plastic tubing. The ends of the electrical wires opposite from the thermistors are connected to a suitable electrical terminal mounted in the terminal plug structure for connection to the body function recording apparatus.

A better understanding of this invention may be had from the following detailed description when read in connection with the accompanying drawings, in which:

FIG. 1 is a pictorial representation of a respiration detector according to the present invention positioned in situ on a person under observation, FIG. 2 is a top plan view, partly broken away, of the respiration detector shown in FIG. 1, FIG. 3 is a bottom plan view of the detector shown in FIG. 2 with a back cover member partially broken away, FIG. 4 is a cross-sectional view of the detector taken along the line 4—4 of FIG. 2, FIG. 5 is a cross-sectional view taken along the line 5—5 of FIG. 2, and FIG. 6 is an enlarged, fragmentary sectional view taken along the line 6—6 of FIG. 3.

Referring now to the drawings in more detail, there is shown, in FIG. 1, the head and face 2 of a person under observation. A headband 4 holds firmly in place on the head, a padded ear cup 6. Within the ear cup 6 there may be positioned a suitable blood pressure and pulse rate detector which clamps on the pinna of the ear. Such a detector is shown and described in the aforementioned co-pending application. A similar detector is shown in the patent to Kompelein 3,051,165. As shown in the aforesaid co-pending application, there is also within the ear cup a suitable multiple socket for receiving the output terminals of the several detector means including that of the detector of the present invention. The several detector signals are applied to corresponding output leads which are formed into a cable 8 for transmission to the monitoring circuitry.

The respiration detector of this invention includes a detector head member 10 mounted on the end of a support member 12. The opposite end of the support member is secured to the ear cup 6 as by means of the socket just referred to and a terminal plug to be described hereinafter. The detector head 10, as shown, is positioned, with respect to the face of the person under observation, to be in the path of the exhaled breath, whether exhalation be through the mouth or the nose.

The details of the structure of the respiration detector is shown in FIGS. 2 to 6. In those figures the body 14 of the detector head 10 is shown substantially as a truncated triangular pyramid with rounded corners and with the base of the pyramid open toward the face to form a hollow dished structure. The truncating plane or the smaller dimension of the truncated pyramidal form is closed by a flat surface member 16 which carries the sensing elements 18. As may be most clearly seen in FIG. 6, the sensing elements 18, which are preferably tiny thermistors, are positioned and sealed on the front face of the flat surface member 16 within the hollow dished portion of the body member with the electrical leads 20 therefrom extending through a small hole 22 in the member 16 to the back side thereof. The leads 20, on the back side of the member 16, lie in a small groove 24 formed in the member 16. As may be seen in FIG. 3, the groove 24 defines a triangular path connecting the three corners of the member 16. A thermistor 18 is positioned at each of the three corners. The thermistors 18, with their corresponding electrical leads, are connected in series as by soldering the leads together. The solder connections 25 lying in the grooves 24 intermediate the thermistors 18.

Across the open or large dimension end of the body member 14 there is a perforated protective screen member 26. The inner surface of the body member 14 is provided with a small transverse groove or notch 28 at each of the curved ends. The screen member 26 is provided with a complementary projection at each end such that when the screen member 26 is placed over the open end of the body member 14 and slightly deformed as by the pressure of a thumb, the projections of the screen member 26 snap into the notches 28. The deformation of the screen member 26, which is made of a suitable resilient material, holds the screen member in position on the body member 14 until it is deliberately removed. The protective screen member 26 serves at least two purposes. First, it mechanically protects the detecting elements 18 from being damaged. Second, it protects the detectors 18 from being influenced to give erroneous indications due to ambient breezes or air motions other than that of breath of the person under observation.

As was previously mentioned, the general form of the body member 14 is that of a truncated triangular pyramid. However the sides are not necessarily of equal length.

One long side may be referred to as the base of the triangle. It is from this base side of the triangle that the support means for the detector head 10 extends. The head member 10 is supported freely in space, with respect to the face of the person under observation, upon one end of a stiff but deformable support member 12. In a detector constructed in accordance with the present invention, a suitable material for the support member 12 was found to be a 16 gage soft brass wire. The end of the support member or wire 12, to which the detector head 10 is attached, is formed into a substantially circular loop to define a stable plane surface. A back cover member 30 is provided for the detector head 10 which is substantially coextensive with the corresponding end of the body member 14. That cover member 30 is provided with a recess, substantially centrally located, which is dimensioned to receive the loop end of the wire or support member 12. The loop of the wire 12 is positioned in the recess in the cover member 30 with the shank of the wire 12 extending out through a suitable exit channel. The loop is secured into the recess by a suitable cement such as an epoxy. The exit channel in the back cover member 30, through which the support wire 12 extends is sufficiently larger than the diameter of the wire 12 that the electrical leads 20 from the detectors or sensing elements 18 may also be brought out through the channel and both the leads 20 and the support wire 12 be encased in a protective sheath 32. After the support wire 12 has been secured to the back cover member 30, the back cover member is secured to the back surface of the body member 14 by a suitable cement. The inner surface of the back cover member 30 is provided with a pair of locating pins or stubs 34 which match-up with and are inserted into corresponding holes 36 in the flat surface member 16.

The opposite end of the support wire 12, together with the leads 20 and the sheath 32, terminate in a terminal plug structure 38. The support wire 12 is secured in the plug 38 by a suitable cement, again such as an epoxy, as is the sheath 32. The leads 20 are secured, by conventional means, to a connector plug 40 extending from the end of structure 38 for connection to the socket, hereinbefore mentioned, mounted on the ear cup 6. A stabilizing pin or stub 42 also extends from the end of the plug structure for cooperation with a corresponding recess in the aforementioned socket, to prevent the plug from inadvertently turning in its socket.

The several parts of the detector head 10, with the exception of the thermistors 18, their leads 20 and the support wire 12, are all made of a suitable light weight plastic material. One such suitable plastic material is a polymer produced under the trade name of "Cycolac," an A.B.S. polymer, by the Marbon Chemical Division of Borg-Warner Corp. This material is lightweight, mechanically tough, and capable of being clinically sterilized.

In operation, the structure is positioned on the person under observation such that the detector head 10 is in the path of the breath exhalations whether such exhalations issue from the person's mouth, his nose or both. The electrical leads 20 from the thermistors 18 of detector may be connected, through the connector plug 40, to any suitable electronic circuitry capable of taking advantage of the characteristics of the thermistors. One such circuit is shown generally in U.S. Patent 2,831,181—Warner. There, a small electric current is passed through the thermistor to effect a heating thereof. As the person under observation breathes on the thermistors, the resultant cooling thereof produces a change in the impedance of the thermistors, a change which produces a detectable electric signal. The signal thus produced may then be used to actuate any desired subsequent equipment such as recorders, indicators, or alarms, all in a known manner. With the head band 4 and the ear cup 6 held firmly in place on the head of the person under observation, the terminal plug 38 may be inserted in the socket (not shown) on the ear cup 6. The detector head 10 may then be moved into the desired position with respect to the person's face by bending or deforming the support wire 12. Once the desired position has been achieved, the stiffness of the support member will hold the detector head 10 in that position.

The position of the detector head 10, spaced from both nose and mouth, provides means for detecting the breathing of the person without having the detecting apparatus so fastened to either the nose or mouth as to constitute a considerable inconvenience or discomfort to the person under observation, or to restrict his breathing, as in prior art devices. Further, the material from which the structure is made and its sealed construction enables this detector to be conveniently clinically sterilized.

Thus, there has been provided an improved respiration detector for medical instrumentation purposes which is characterized in improved convenience of application and operation as well as its lack of inconvenience and discomfort to the person under observation.

What is claimed is:

A respiration detector comprising, in combination, a detector head member including a plastic dished body member substantially in the form of a truncated triangular pyramid having an open base, a flat surface member closing the truncating plane of said body member, a plurality of thermistor sensing elements mounted and sealed on the inner face of said flat surface member, a perforated plastic protective cover member removably mounted to close the open face of said body member, a back cover member sealed to the back surface of said flat surface member, a deformable but stiff support wire sealed at one end into said back cover member, a terminal plug secured to said support wire at the opposite end from said head member, said thermistor sensing elements being connected in series and having a pair of lead wires brought out of said head member adjacent said support wire, an electrical terminal connector forming a part of said terminal plug, said lead wires being connected to said terminal connector, and a protective plastic sheath encasing said support wire and said lead wires between said head member and said terminal plug.

References Cited by the Examiner

UNITED STATES PATENTS

| | | | |
|---|---|---|---|
| 375,702 | 12/1887 | Fasoldt | 248—160 |
| 2,161,370 | 6/1939 | Mears | 128—2.1 |
| 2,353,070 | 7/1944 | Pitkin | 179—156 |
| 2,582,859 | 1/1952 | Centofanti | 338—25 |
| 2,831,181 | 4/1958 | Warner | 128—2 X |

FOREIGN PATENTS

| | | |
|---|---|---|
| 1,139,596 | 2/1957 | France. |

RICHARD A. GAUDET, *Primary Examiner.*